(12) United States Patent
Hack

(10) Patent No.: US 11,613,205 B2
(45) Date of Patent: Mar. 28, 2023

(54) VEHICLE COLOR-LIGHTING CONTROL SYSTEM AND METHOD

(71) Applicants: BOMBARDIER INC., Dorval (CA); SHORT BROTHERS PLC, Belfast (IE)

(72) Inventor: Jonathan Wayne Hack, Burlington (CA)

(73) Assignee: BOMBARDIER INC., Dorval (CA)

(*) Notice: Subject to any disclaimer, the term of this patent is extended or adjusted under 35 U.S.C. 154(b) by 1181 days.

(21) Appl. No.: 15/998,944

(22) PCT Filed: Feb. 17, 2017

(86) PCT No.: PCT/IB2017/050926
§ 371 (c)(1),
(2) Date: Aug. 17, 2018

(87) PCT Pub. No.: WO2017/141213
PCT Pub. Date: Aug. 24, 2017

(65) Prior Publication Data
US 2021/0206509 A1  Jul. 8, 2021

Related U.S. Application Data

(60) Provisional application No. 62/297,210, filed on Feb. 19, 2016.

(51) Int. Cl.
*B60Q 3/00* (2017.01)
*B60Q 3/74* (2017.01)
(Continued)

(52) U.S. Cl.
CPC .............. *B60Q 3/74* (2017.02); *B60Q 3/47* (2017.02); *G09F 19/12* (2013.01); *G09F 21/10* (2013.01);
(Continued)

(58) Field of Classification Search
CPC . B64D 2011/0038; G09F 19/12; G09F 21/10; B60Q 3/74; B60Q 3/47
See application file for complete search history.

(56) References Cited

U.S. PATENT DOCUMENTS

| 6,402,354 | B1 | 6/2002 | Tatewaki et al. |
| 7,505,136 | B2 | 3/2009 | Romig et al. |

(Continued)

FOREIGN PATENT DOCUMENTS

| CN | 105126226 A | * 12/2015 |
| DE | 102005026807 A1 | 12/2006 |

(Continued)

OTHER PUBLICATIONS

PCT international Search Report and Written Opinion dated Apr. 19, 2017, re: International Application No. PCT/IB2017/050926.
(Continued)

*Primary Examiner* — Gerald J Sufleta, II
(74) *Attorney, Agent, or Firm* — Norton Rose Fulbright Canada LLP

(57) ABSTRACT

There is described a vehicle color-lighting control system. The system comprises at least one sidewall (101) having an electrically-controllable coloring mechanism (106) embedded therein and arranged for coloring at least a portion of the at least one sidewall with at least one first color; a lighting sub-system (110) comprising at least one light source (112) mounted within the vehicle to illuminate an interior of the vehicle with at least one second color in a first state and with at least one third color in a second state; and a controller coupled to the coloring mechanism and the lighting sub-system and configured for operating the coloring mechanism to color the at least one portion of the at least one sidewall with the at least one first color and concurrently illuminate the interior of the vehicle with the at least one second color.

19 Claims, 4 Drawing Sheets

(51) Int. Cl.
*B60Q 3/47* (2017.01)
*G09F 19/12* (2006.01)
*G09F 21/10* (2006.01)
*B64D 11/00* (2006.01)

(52) U.S. Cl.
CPC .. *B64D 2011/0038* (2013.01); *B64D 2203/00* (2013.01)

(56) References Cited

U.S. PATENT DOCUMENTS

| | | | |
|---|---|---|---|
| 7,534,016 B2 | 5/2009 | Stavaeus et al. | |
| 8,064,120 B2 | 11/2011 | Callahan et al. | |
| 8,933,819 B1* | 1/2015 | Garrettson | G09F 21/10 340/945 |
| 2005/0200937 A1* | 9/2005 | Weidner | G02F 1/163 359/275 |
| 2008/0042012 A1* | 2/2008 | Callahan | B64C 1/1492 359/275 |
| 2008/0104642 A1 | 5/2008 | Galipeau et al. | |
| 2008/0239451 A1* | 10/2008 | Mitchell | B60J 3/04 359/265 |
| 2012/0235568 A1* | 9/2012 | Prodin | B60Q 3/80 315/77 |
| 2013/0067834 A1 | 3/2013 | Downey et al. | |
| 2014/0118810 A1* | 5/2014 | Mohat | B64C 1/1484 359/238 |
| 2014/0303788 A1 | 10/2014 | Sanders et al. | |
| 2014/0324299 A1 | 10/2014 | Sorensen | |
| 2014/0368113 A1 | 12/2014 | Eckel | |
| 2014/0376747 A1 | 12/2014 | Mullet et al. | |
| 2015/0092259 A1 | 4/2015 | Greer et al. | |
| 2015/0170604 A1* | 6/2015 | Iwagaki | G09G 5/02 345/589 |
| 2017/0189640 A1* | 7/2017 | Sadwick | H05B 45/20 |
| 2017/0286037 A1* | 10/2017 | Sizelove | B64D 11/0015 |

FOREIGN PATENT DOCUMENTS

| | | |
|---|---|---|
| DE | 102007008164 A1 | 8/2008 |
| WO | 2015130572 A1 | 9/2015 |

OTHER PUBLICATIONS

English translation of patent document No. DE 102007008164 dated Aug. 21, 2008, https://patents.google.com/patent/DE102005026807A1/en?oq=DE102005026807, accessed on Jul. 17, 2018.

English translation of patent document No. DE 102005026807 dated Dec. 14, 2006, https://patents.google.com/patent/DE102007008164A1/en?oq=DE102007008164, accessed on Jul. 17, 2018.

CNIPA, Office Action for CN Application No. 201780012031.0 dated Oct. 12, 2021.

CNIPA, Office Action for CN Application No. 201780012031.0 dated Jan. 4, 2021.

EPO, Office Action for EP Application No. 17708886.1 dated Apr. 7, 2019.

\* cited by examiner

VEHICLE COLOR-LIGHTING CONTROL SYSTEM AND METHOD

CROSS-REFERENCE TO RELATED APPLICATIONS

The present application is a national phase application under 35 U.S.C. 371 of International Patent Application No. PCT/IB2017/050926 filed on Feb. 17, 2017, which claims priority from U.S. Provisional Patent Application No. 62/297,210 filed on Feb. 19, 2016, the contents of which are hereby incorporated by reference.

TECHNICAL FIELD

The present disclosure relates generally to the field of color-lighting controls, and more particularly, to color-lighting controls inside a vehicle.

BACKGROUND OF THE ART

Many vehicles include lighting controls for generally illuminating the interior of the vehicle. These lighting controls may be manually controlled or automatically controlled, depending on the vehicle. Vehicles may also have other control systems, such as audio, window shades, window dimming, etc. At present, the lighting control system of a vehicle is provided independently from other vehicle control systems.

It is desirable to integrate various control systems of a vehicle.

SUMMARY

In accordance with a first aspect, there is provided a vehicle branding system. The system comprises at least one sidewall comprising an electrically-controllable coloring mechanism and arranged for coloring at least a portion of the at least one sidewall with at least one first color when operating in a branding state; a lighting sub-system comprising at least one light source mounted within the vehicle to illuminate an interior of the vehicle with at least one second color when operating in the branding state and with at least one third color when operating in a non-branding state; and a controller coupled to the coloring mechanism and the lighting sub-system and configured for operating the coloring mechanism and the at least one light source concurrently in the branding state.

In some embodiments, the controller is configured for setting the coloring mechanism and the at least one light source to the branding state simultaneously.

In some embodiments, the at least one first color and the at least one second color are a same color. In some embodiments, the same color is non-white and the third color is white.

In some embodiments, the controller is configured to set the coloring mechanism to a first saturation level of the same color and to set the at least one light source to a second saturation level of the same color different from the first saturation level when operating in the branding state. In some embodiments, the controller is configured to set the coloring mechanism to a first tint of the same color and to set the at least one light source to a second tint of the same color different from the first tint when operating in the branding state. In some embodiments, the controller is configured to set the coloring mechanism to a first tone of the same color and to set the at least one light source to a second tone of the same color different from the first tone when operating in the branding state.

In some embodiments, the controller is configured to cycle the coloring mechanism and the at least one light source through a plurality of colors when operating in the branding state.

In some embodiments, the controller is configured to cycle the coloring mechanism and the at least one light source through a plurality of at least one of shades, tints, and tones of colors when operating in the branding state.

In some embodiments, the system further comprises an audio system coupled to the controller, and wherein the controller is configured for coordinating playing of audio on the audio system with operating the coloring mechanism and the at least one light source in the branding state.

In some embodiments, the controller is configured to coordinate setting the coloring mechanism and the at least one light source to the branding state with a given event.

In some embodiments, the at least one sidewall is part of an aircraft and the interior is an aircraft cabin. In some embodiments, the at least one portion is a window of the aircraft, and wherein the electrically-controllable coloring mechanism comprises a color-coated shield.

In accordance with a further aspect, there is provided a method for branding a vehicle. The method comprises providing at least one sidewall comprising an electrically-controllable coloring mechanism and arranged for coloring at least a portion of the at least one sidewall with at least one first color when operating in a branding state; providing a lighting sub-system comprising at least one light source mounted within the vehicle to illuminate an interior of the vehicle with at least one second color when operating in the branding state and with at least one third color when operating in a non-branding state; and operating, from a controller coupled to the coloring mechanism and the lighting sub-system, the coloring mechanism and the at least one light source concurrently in the branding state.

In some embodiments, the method further comprises setting the coloring mechanism and the at least one light source to the branding state simultaneously.

In some embodiments, the at least one first color and the at least one second color are a same color. In some embodiments, the same color is non-white and the third color is white.

In some embodiments, operating the coloring mechanism and the at least one light source in the branding state comprises setting the coloring mechanism to a first saturation level of any one of saturation, tint, and tone of the same color and setting the at least one light source to a second saturation level of any one of saturation, tint, and tone of the same color different from the first saturation level.

In some embodiments, operating the coloring mechanism and the at least one light source in the branding state comprises cycling the coloring mechanism and the at least one light source through a plurality of colors.

In some embodiments, operating the coloring mechanism and the at least one light source in the branding state comprises cycling the coloring mechanism and the at least one light source through a plurality of at least one of shades, tints, and tones of colors when operating in the branding state.

In some embodiments, the method further comprises providing an audio system coupled to the controller, and coordinating playing of audio on the audio system with operating the coloring mechanism and the at least one light source in the branding state.

In some embodiments, operating the coloring mechanism and the at least one light source in the branding state comprises coordinating operating in the branding state with a given event.

In accordance with a further aspect, there is provided an aircraft color-lighting control system. The system comprises at least one sidewall comprising an electrically-controllable coloring mechanism and arranged for coloring at least a portion of the at least one sidewall with at least one first color; a lighting sub-system comprising at least one light source mounted within the vehicle to illuminate an interior of the vehicle with at least one second color in a first state and with at least one third color in a second state; and a controller coupled to the coloring mechanism and the lighting sub-system and configured for concurrently operating the coloring mechanism to color the at least one portion of the at least one sidewall with the at least one first color and the lighting sub-system to illuminate the interior of the vehicle with the at least one second color.

In some embodiments, the at least one portion is a window of the aircraft, and the electrically-controllable coloring mechanism comprises a color-coated shield.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

There is described herein a vehicle color-lighting control system for use with any vehicle such as an aircraft, a train, a bus, a subway car, a limousine, or any other type of vehicle. The vehicle may be composed of one or more sidewalls that form an enclosure and define an interior of the vehicle. The vehicle color-lighting control system may be used for creating a desired ambiance and/or branding the vehicle in accordance with one or more branding colors of an owner, a sponsor, or any other entity associated with the vehicle, such as a political party, a government, a country, etc. For example, the vehicle may be an aircraft and the vehicle color-lighting control system may be configured to brand the aircraft with colors associated with an airline operating the aircraft. In another example, the vehicle may be a train, the meal served during the train ride may be provided by a large restaurant chain, and the vehicle color-lighting control system may be configured to brand the train with colors associated with the restaurant chain. Use of the vehicle color-lighting control system as an ambiance creating system or as a branding system will be explained in more detail below.

Figure 1:
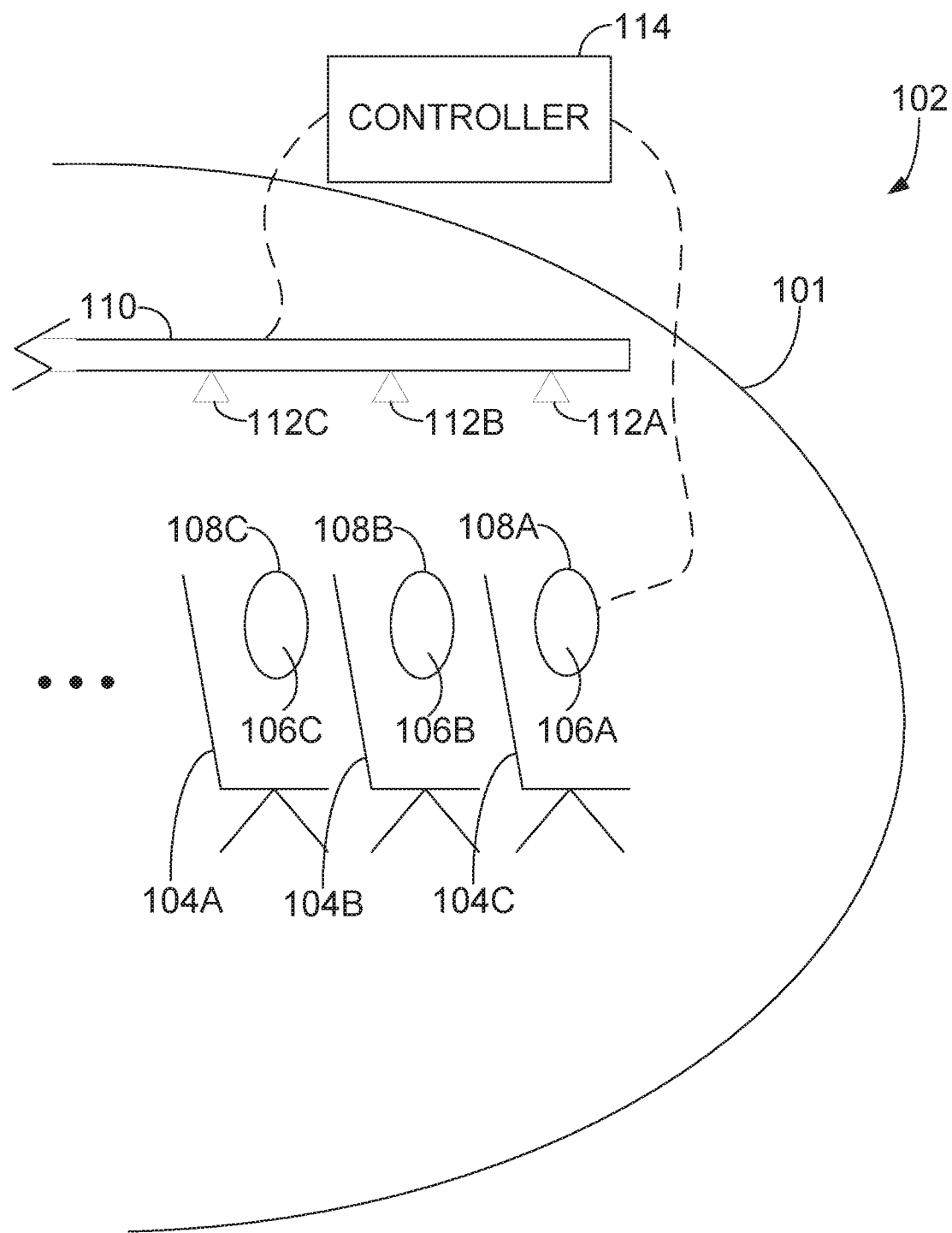
FIG. 1 is a schematic diagram of an example vehicle having a color-lighting control system.

Referring to FIG. 1, there is illustrated an example vehicle 102. Seats 104a, 104b, 104c are provided in successive rows and aligned along the vehicle sidewalls 101. At least one of the sidewalls 101 comprises at least one electrically-controllable coloring mechanism 106a, 106b, 106c (collectively referred to herein as 106). The coloring mechanism 106 serves to color at least a portion 108a, 108b, 108c (collectively referred to herein as 108) of the sidewall 101 with at least one first color when it is activated. Although illustrated as an ellipse, the portion 108 may take on another shape, such as but not limited to rectangular, square, circular, other geometrical shapes, and other non-regular shapes. In some embodiments, the coloring mechanism 106 is hidden in the sidewall 101 or recessed therein, covered by a relief or overlap of the sidewall 101. Alternatively, the coloring mechanism 106 is in full view on the sidewall 101.

Figure 2:
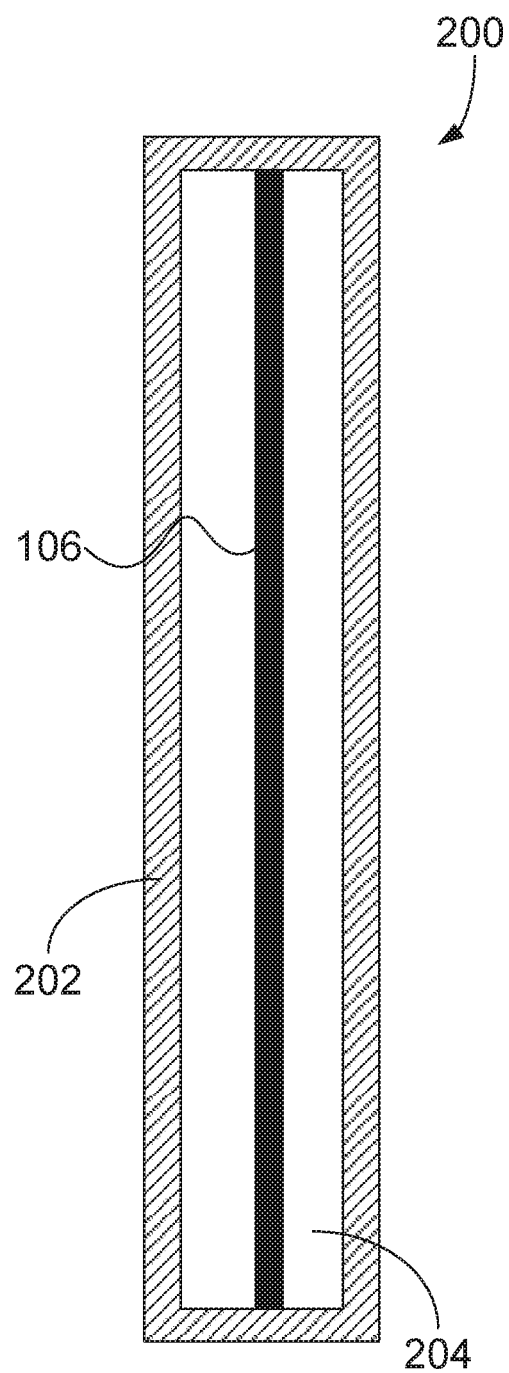
FIG. 2 is a cross-sectional view of an example embodiment for a window structure with an embedded coloring mechanism.

In some embodiments, the portion 108 of the sidewall 101 may be defined by a window. The coloring mechanism 106 may be provided in each window structure of the vehicle 102, or it may be provided in only some of the window structures, strategically selected throughout the vehicle 102. An example embodiment of a window structure 200 is illustrated in FIG. 2. The window structure 200 may consist of structural components 202 surrounding a panel 204. In some embodiments, the panel 204 is a transparent or translucent window that allows the passage of light and through which a passenger may see outside of the vehicle 102. The window may be made of glass, plastic, fiberglass, acrylic, plexi-glass or any other material capable of having translucent or transparent properties. In some embodiments, the panel 204 is provided with variable opacity, such as by altering its light transmission properties when voltage, light, or heat is applied. The panel 204 may change from blocking some or all wavelengths of light to letting some or all wavelengths of light pass through. Some example technologies for providing variable opacity are electrochromic, photochromic, thermochromic, suspended particle, micro-blind, nanocrystal, and polymer dispersed liquid crystal devices. Other technologies are also considered.

The coloring mechanism 106 may be provided inside the panel 204 and arranged to color the panel 204 when activated. In some embodiments, the coloring mechanism may comprise one or more light sources, such as light emitting diodes (LEDs) controllable to generate the one or more color. The LEDs may be of a single color, such as red or yellow or green or blue, and the coloring mechanism 106 may color the portion 108 of the sidewall 101 a single color. Alternatively, the LEDs may be of a plurality of colors, such as red, yellow, green, and blue and they may be used to generate a plurality of colors using various combinations of the red, yellow, green, and blue LEDs. In some embodiments, the light sources may be white and a color-coated shield may be used to provide the desired color on the portion 108 of the sidewall 101. The color-coated shield, also referred to as a smart film, may be provided in various colors, such as grey, blue, green, pink, yellow, red, black, and bronze, and operate on an electrical principle, switching from frosted (opaque) to clear (transparent) when power is applied. In its frosted state, the shield acts as an electronic blind of the given color. Other arrangements for providing color to a window may also be used.

In some embodiments, the portion 108 may correspond to a small or large fraction of the sidewall 101 that is not defined by a window. For example, the coloring mechanism 106 may comprise a display device that can be configured to selectively display one or more colors. The display device may be embedded in the sidewall 101 and extend along a length of the vehicle 102. Alternatively, a plurality of display devices may be provided along the length of the vehicle 102, instead of windows. Also alternatively, one or more display devices may be provided in addition to one or more windows. In some embodiments, the display device can present information (including text and images) in visual form and may be provided using various technologies, such as, but not limited to, Light-emitting diodes (LEDs), Liquid Crystal Displays (LCD), Organic light-emitting diodes (OLEDs), surface-conduction electron-emitter display (SED), plasma display panel (PDP), electroluminescent display (ELD), and laser video display. In such embodiments, any one of these technologies may be used as the coloring mechanism 106.

The coloring mechanism 106 may be configured to operate in a branding state and in a non-branding state. When operating in the branding state, the coloring mechanism 106 may be configured for one or more color or color sequence. A color sequence comprises applying a change to at least one color parameter over a given time period, such as color, color intensity, color saturation, color tone, and color tint. For example, a color sequence may comprise red at a static level of intensity, saturation, tone, and tint, for 30 seconds, followed by red at the same levels of saturation, tone and tint but a different level of intensity, for another 15 seconds. In another example, a color sequence may comprise red and blue alternating every 10 seconds for a given time period, at static levels of intensity, saturation, tone, and tint. In yet another example, a color sequence may comprise yellow, green, and purple, each one for 15 seconds, with a static saturation, tone, and tint and a dynamic intensity that starts high and progressively decreases over the 15 second period. In some embodiments, operating in the branding state comprises displaying one or more color sequences for a given time period. The one or more color sequences may be cycled during the given time period, or each color sequence may be set to display only once.

In some embodiments, operating in a non-branding state simply means that the coloring mechanism 106 is inactive. For example, when referring to a window structure implementation, operating in a non-branding state may mean that the panel 204 remains transparent and allows all light to pass through. In some embodiments, operating in a non-branding state means that the panel 204 is non-colored, but it may still be modified with regards to opacity and other non-color properties. In some embodiments, operating in a non-branding state means that a color other than a branding color is activated. For example, the branding color may be red and the color mechanism 106 may color the portion 108 of the sidewall 101 red only when it is in the branding state, whereas it may color the portion 108 of the sidewall 101 blue, green, yellow or purple when it is in the non-branding state. When referring to a display device implementation, operating in a non-branding state may mean that the display device is turned off. Alternatively, it may mean that something other than color is displayed on the display device, such as text and images. When in a non-branding state, the display device may be used to emulate an outdoor scene as viewed from the vehicle 102. The display device may also be used to represent an alternative view from the vehicle, such as a blue sky or a snowy mountain view. In some embodiments, the display device may remain blank or be set to a uniform display without images or text when in the non-branding state. In some embodiments, operating in a non-branding state means that a color other than a branding color is activated on the display device.

Referring back to FIG. 1, there is provided a lighting sub-system 110 that is mounted within the vehicle 102 to illuminate its interior with at least one second color. The second color may be the same as the first color, i.e. the color with which the portion 108 of the sidewall 101 is colored, or it may be a different color. The lighting sub-system 110 comprises at least one light source 112a, 112b, 112c (collectively referred to as 112) separate from any light source used within the coloring mechanism 106. The lighting sub-system 110 may be configured to operate in the branding state and in the non-branding state. When in the non-branding state, white and/or colored light may be illuminated within the interior of the vehicle 102. When in the branding state, the light source 112 is set to be controlled in a coordinated manner with the coloring mechanism 106. In some embodiments, control of the light source 112 and the coloring mechanism 106 is coordinated so that a same or similar color or color sequence is provided on the sidewall 101 portion 108 and inside the vehicle 102. In some embodiments, operating in a branding state is defined by the coordinated display and control of color between the coloring mechanism 106 and the light source 112, with regards to color, pattern, timing, and/or other branding defining parameters.

A controller 114 is coupled to the coloring mechanism 106 and the lighting subsystem 110 and configured for operating the coloring mechanism 106 and the light source 112 concurrently in the branding state. Concurrent operation refers to control of the coloring mechanism 106 and the light source 112 in a coordinated manner. For example, the coloring mechanism 106 may display a first color or color sequence over a given time span and the light source 112 may display a second color or color sequence over the same time span. The two colors or color sequences may be the same or different. For example, concurrent operation may comprise operating the coloring mechanism 106 in accordance with a first color or color sequence of red at a first tint and operating the light source 112 with a second color or color sequence of red at a second tint, such that the first tint generates a dark red and the second tint generates a light red. Concurrent operation may comprise varying an intensity parameter of the first color of the coloring mechanism 106 while varying a saturation parameter of the second color of the light source 110. The color parameters of the coloring mechanism 106 and the light source 112 are thus coordinated but can vary independently either as a result of a control input, or as a result of a pre-programed sequence over a given time period. As such, the color parameters may be set to vary automatically, via the color sequence settings, or they may be set to vary manually through manual control of an input device.

In some embodiments, the controller 114 is configured to operate the coloring mechanism 106 and the light source 112 simultaneously. Simultaneous operation refers to the control of the coloring mechanism 106 and the light source 112 in the same manner over the given time period. For example, in the case where the coloring mechanism 106 is operated in accordance with a first color or color sequence of red at a first tint and the light source 112 is operated with a second color or color sequence of red at a second tint, changes made to any color parameters, such as tone, tint, and intensity, would be applied simultaneously to both the coloring mechanism 106 and the light source 112. Therefore, while the color or color sequences displayed by the coloring mechanism 106 and the light source 112 may be different, control of the coloring mechanism 106 and the light source 112 with regards to any parameter is effected together, such that they change together in the same way.

The controller 114 may communicate with the coloring mechanism 106 and the lighting subsystem 110 in a variety of ways. For example, the controller 114 may communicate via wire-based technology, such as electrical wires or cables, and/or optical fibers. The controller 114 may also communicate via wireless means, such as RF, infrared, Wi-Fi, Bluetooth, cellular radio, and others. As such, communication with the controller 114 may therefore traverse a network, such as the Internet, the Public Switch Telephone Network (PSTN), a cellular network, or others known to those skilled in the art. In some embodiments, the controller 114 is part of a cabin management system (CMS) of an aircraft.

Figure 3:
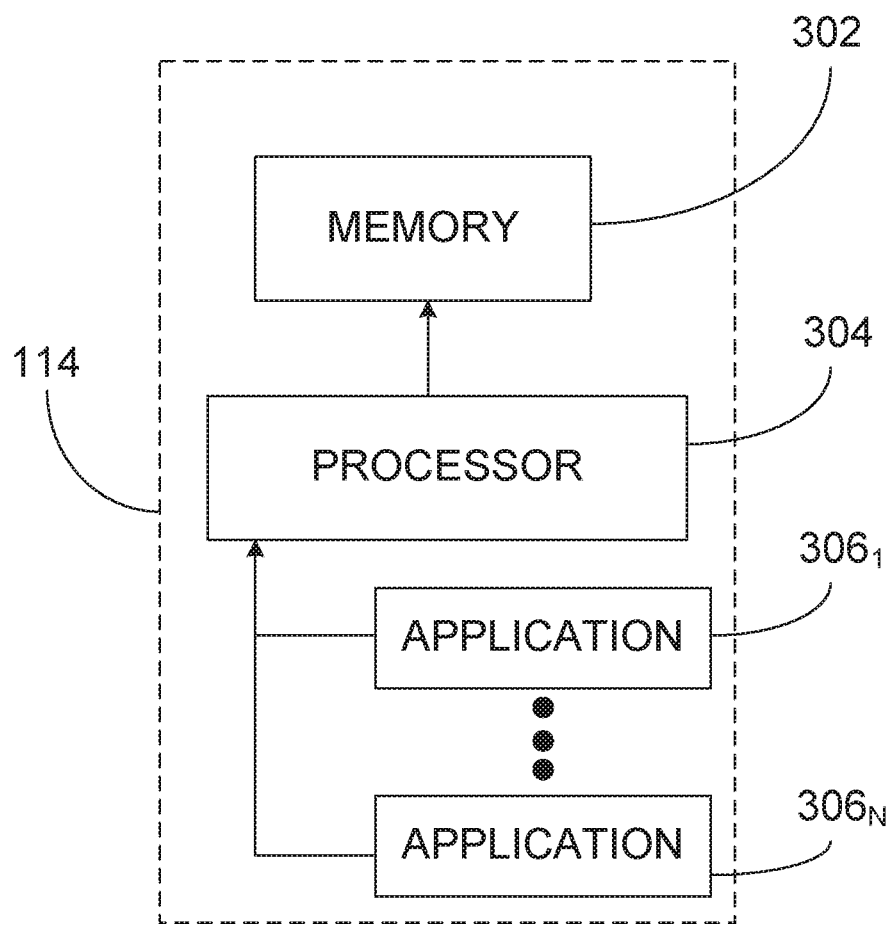
FIG. 3 is a block diagram of an example embodiment for a controller of a vehicle color-lighting control system.

An example embodiment of the controller 114 is illustrated in FIG. 3. The controller 114 may comprise, amongst other things, a plurality of applications $306_1 \ldots 306_N$ running on a processor 304 coupled to a memory 302. It should be understood that while the applications $306_1 \ldots 306_N$ presented herein are illustrated and described as separate entities, they may be combined or separated in a variety of ways. The memory 302 accessible by the processor 304 may receive and store data. The memory 302 may be a main memory, such as a high speed Random Access Memory (RAM), or an auxiliary storage unit, such as a hard disk, a floppy disk, or a magnetic tape drive, or any combination thereof. The memory 302 may be any other type of memory, such as a Read-Only Memory (ROM), or optical storage media such as a videodisc and a compact disc. The processor 304 may access the memory 302 to retrieve data. The processor 304 may be any device that can perform operations on data. Examples are a central processing unit (CPU), a front-end processor, a microprocessor, and a network processor. The applications $306_1 \ldots 306_N$ are coupled to the processor 304 and configured to perform various tasks.

Figure 4:
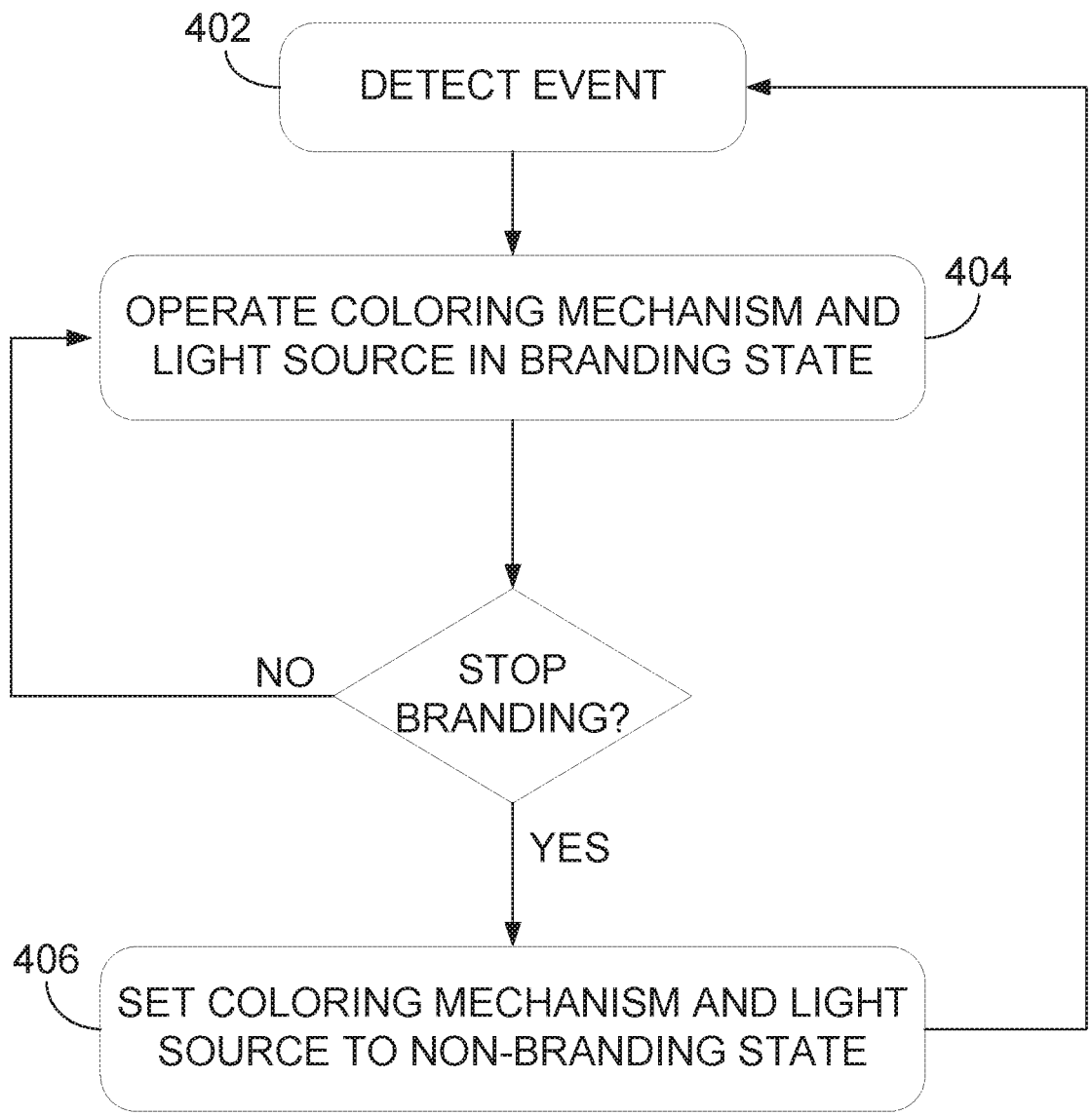
FIG. 4 is a flowchart of an example embodiment for operating the vehicle color-lighting control system.

In some embodiments, the controller 114 is configured for setting the coloring mechanism 106 and the light source 112 to the branding state upon detection of a given event. FIG. 4 is a flowchart of an example method implemented by an application, such as application $306_1$ running on processor 304 of the controller 114. At step 402, an event is detected. The event may correspond to a departure or an arrival of a vehicle. For example, a departure may be detected upon start-up of the vehicle 102 or based on a displacement/acceleration of the vehicle 102. Arrival may be detected using a global positioning system and a target destination. Arrival may also be detected based on a predetermined unit of travel from the departure location to the destination, such as a given number of kilometers or miles. In an aircraft, departure/arrival may be detected based on a weight-on-wheels parameter or based on an ascent/decent of the aircraft, respectively. Alternatively, or in combination therewith, an event may correspond to an in-trip event, such as a meal, an announcement, or a predetermined time. For example, the event may correspond to reaching the half-way mark of the trip, or it may correspond to an announcement of the conductor or pilot of the vehicle. The event may correspond to the beginning of meal service, or the end of a meal service. In some embodiments, the event is a manual trigger of the controller 114, using for example a graphical user interface (not shown) or another device connectable to the controller 114 via wired or wireless means. For example, any member of an aircraft operating the intercom for an announcement may correspond to a trigger of the controller 114 to operate in the branding state. The other device may be a portable device, such as a smartphone, a laptop, and a tablet, or it may be another computer, either integrated within the vehicle or provided separately therefrom. The branding system may therefore be used at any desired time before, during, or after a trip, by an operator or crew member.

At step 404, the controller 114 operates the coloring mechanism 106 and the light source 112 in the branding state. As indicated above, the branding state may correspond to any color/colors or color sequence(s) to which the coloring mechanism 106 and the light source 112 are set. The branding state may also correspond to a coordinated display of colors, patterns, and/or other branding defining parameters by both the coloring mechanism 106 and the light source 112 concurrently.

The controller 114 may be configured to apply different levels of various color parameters between the color displayed by the coloring mechanism 106 and the color displayed by the light source 112, such as saturation, lightness, tinting, toning, shading, and/or intensity. For example, the controller 114 may be configured to set the coloring mechanism 106 to a first saturation level of a color and to set the light source 112 to a second saturation level of the same color different from the first saturation level when operating in the branding state. Saturation should be understood to define a range from pure color (100%) to gray (0%) of a given color at a constant lightness level. The controller 114 may be configured to set the coloring mechanism 106 to a first lightness level of a color and to set the light source 112 to a second lightness level of the same color different from the first lightness level when operating in the branding state. Lightness should be understood to define a range from dark (0%) to fully illuminated (100%) for a given color. An original color has an average lightness level of 50%. The controller 114 may be configured to set the coloring mechanism 106 to a first intensity level of a color and to set the light source 112 to a second intensity level of the same color different from the first intensity level when operating in the branding state. Intensity should be understood to mean a number of photons a light source emits. Other light and/or color parameters may also be varied between the color displayed by the coloring mechanism 106 and the color displayed by the light source 112.

In some embodiments, operating the coloring mechanism 106 and the light source 112 in the branding state may comprise cycling the coloring mechanism 106 and the light source 112 through a plurality of color sequences together. For example, the coloring mechanism 106 and the light source 112 may follow a sequence of red, white, and blue, where each color is held for 5 seconds. Other color sequences and/or other time settings may be used. In some embodiments, the controller 114 may also be configured to apply different color/light parameters, such as saturation, lightness, and/or intensity, while cycling the colors. In some embodiments, cycling the coloring mechanism 106 and the light source 112 may comprise setting different colors on the coloring mechanism 106 and the light source 112 in a coordinated manner. For example, over a 15 second span, the coloring mechanism 106 may be set to red for 5 seconds, blue for 5 seconds, and white for 5 seconds. Over the same 15 second span, the light source 112 may be set to blue for 5 seconds, white for 5 seconds, and red for 5 seconds. This particular color and time combination may itself be associated with a brand, such as an airline, a sponsor, an organization, etc.

While operating the coloring mechanism 106 and the light source 112 in the branding state, as per step 404, there may be a determination as to whether operation in the branding state should continue or end. In some embodiments, this determination is based on a timing criteria. For example, the branding state is set to operate for 5 seconds, 30 seconds, 2 minutes, or any other predetermined time. In some embodiments, the determination is based on whether the event has ended or not. For example, if the event is an announcement over the intercom, the event may be deemed to have ended when the intercom button is released, or when the intercom is deactivated. In some embodiments, the determination is based on a trigger, either manual or automatic. For example, if the event is a meal service, a trigger such as a vehicle attendant pressing a button (manual) or replacing a meal cart (automatic) may act as the trigger to end the branding activity.

Once the determination to end the branding activity is made, the controller 114 may set the coloring mechanism 106 and the light source 112 to the non-branding state, as per step 406. In some embodiments, this may mean deactivating the coloring mechanism 106 or allowing it to return to a previous state, whether it was displaying text, images, videos, or any other content. For the light source 112, setting to the non-branding state may mean displaying white light, displaying a color other than a branding color, or simply returning to its previous state, before the branding state was activated. Alternatively, returning to the non-branding state may comprise de-coupling the control of the coloring mechanism from the light source so that the two can be controlled independently.

In some embodiments, the controller 114 is also coupled to an audio system (not shown) or any other cabin management system. The audio system may be used to play music in the vehicle 102 or for other audio purposes, such as making announcements to passengers. The controller 114 may be configured for coordinating playing audio on the audio system with setting the coloring mechanism 106 and the light source 112 to the branding state. For example, a specific musical sequence may be associated with a brand and coordinated with the coloring sequence provided by the coloring mechanism 106 and the light source 112 during the branding activity. The musical sequence may have a volume level associated with it, also controllable by the controller 114. The controller 114 may therefore be configured to control any one or more of color, color intensity, color saturation, color tone, color tint, color sequence, audio selection, audio volume, audio sequence, and activation timing for a branding activity within a vehicle 102.

In some embodiments, the vehicle color-lighting control system described herein is used to provide a desired ambiance in the vehicle 102. For example, the coloring mechanism 106 and the light source 112 are operated concurrently or simultaneously to provide a desired ambiance, such as an early morning ambiance, a meal-time ambiance, or a night-time ambiance. The color or color sequences associated with the coloring mechanism 106 may be the same as or different from the color or color sequences associated with the light source 112. In some embodiments, the coloring mechanism 106 and the light source 112 are operated simultaneously to provide a desired ambiance, such that any changes or adjustments applied to the color parameters of the color(s) or color sequence(s) displayed by coloring mechanism 106 and the light source 112 are made to both in a same manner.

Specific colors or color sequences may be associated with each ambiance and triggered manually or automatically, using a similar method as that illustrated in FIG. 4. In some embodiments, there may be an additional step of determining which one of a plurality of color sequences to use, as a function of the desired ambiance, provided either within step 402 of detecting an event or after step 402, but before step 404. Instead of operation in the branding state, the method would comprise operating according to a given ambiance color or color sequence, as a function of the event as detected. Other embodiments for operating the vehicle color-lighting control system to provide a desired ambiance in the vehicle 102 may also be used.

The above description is meant to be exemplary only, and one skilled in the relevant arts will recognize that changes may be made to the embodiments described without departing from the scope of the invention disclosed. For example, the blocks and/or operations in the flowcharts and drawings described herein are for purposes of example only. There may be many variations to these blocks and/or operations without departing from the teachings of the present disclosure. For instance, the blocks may be performed in a differing order, or blocks may be added, deleted, or modified. While illustrated in the block diagrams as groups of discrete components communicating with each other via distinct data signal connections, it will be understood by those skilled in the art that the present embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present embodiment. The present disclosure may be embodied in other specific forms without departing from the subject matter of the claims. Also, one skilled in the relevant arts will appreciate that while the systems, methods and computer readable mediums disclosed and shown herein may comprise a specific number of elements/components, the systems, methods and computer readable mediums may be modified to include additional or fewer of such elements/components. The present disclosure is also intended to cover and embrace all suitable changes in technology. Modifications which fall within the scope of the present invention will be apparent to those skilled in the art, in light of a review of this disclosure, and such modifications are intended to fall within the appended claims.

The invention claimed is:

1. A vehicle branding system, the system comprising:
at least one sidewall comprising a plurality of electrically-controllable coloring mechanisms and a plurality of window structures of the vehicle, each coloring mechanism arranged for coloring each of the plurality of window structures with at least one first color when operating in a branding state;
a lighting sub-system comprising at least one light source mounted within the vehicle to illuminate an interior of the vehicle with at least one second color when operating in the branding state and with at least one third color when operating in a non-branding state; and
a controller coupled to the coloring mechanisms and the lighting sub-system and configured for operating the coloring mechanisms and the at least one light source concurrently in the branding state,
wherein the at least one sidewall is part of an aircraft, the interior is an aircraft cabin, each electrically-controllable coloring mechanism comprises a color-coated shield, wherein the at least one light source of the lighting sub-system is separate from any light source used within the coloring mechanisms, and
wherein the branding state is defined by a coordinated display and control of color between the coloring mechanisms and the at least one light source.

2. The system of claim 1, wherein the controller is configured for setting the coloring mechanisms and the at least one light source to the branding state simultaneously.

3. The system of claim 1, wherein the at least one first color and the at least one second color are a same color.

4. The system of claim 3, wherein the same color is non-white and the third color is white.

5. The system of claim 3, wherein the controller is configured to set the coloring mechanisms to a first level of at least one of saturation, tint, and tone of the same color and to set the at least one light source to a second level of at least one of saturation, tint, and tone of the same color different from the first level when operating in the branding state.

6. The system of claim 1, wherein the controller is configured to cycle the coloring mechanisms and the at least one light source through a plurality of colors when operating in the branding state.

7. The system of claim 1, wherein the controller is configured to cycle the coloring mechanisms and the at least one light source through a plurality of at least one of shades, tints, and tones of colors when operating in the branding state.

8. The system of claim 1, further comprising an audio system coupled to the controller, and wherein the controller is configured for coordinating playing of audio on the audio system with operating the coloring mechanisms and the at least one light source in the branding state.

9. The system of claim 1, wherein the controller is configured to coordinate setting the coloring mechanisms and the at least one light source to the branding state with a given event.

10. A method for branding a vehicle, the method comprising:
providing at least one sidewall comprising a plurality of electrically-controllable coloring mechanisms and a plurality of window structures of the vehicle, each coloring mechanism arranged for coloring each of the plurality of window structures with at least one first color when operating in a branding state;
providing a lighting sub-system comprising at least one light source mounted within the vehicle to illuminate an interior of the vehicle with at least one second color when operating in the branding state and with at least one third color when operating in a non-branding state; and
operating, from a controller coupled to the coloring mechanisms and the lighting sub-system, the coloring mechanisms and the at least one light source concurrently in the branding state,
wherein the at least one sidewall is part of an aircraft, the interior is an aircraft cabin, each electrically-controllable coloring mechanism comprises a color-coated shield, wherein the at least one light source of the lighting sub-system is separate from any light source used within the controllable coloring mechanisms, and
wherein the branding state is defined by a coordinated display and control of color between the coloring mechanisms and the at least one light source.

11. The method of claim 10, further comprising setting the coloring mechanisms and the at least one light source to the branding state simultaneously.

12. The method of claim 10, wherein the at least one first color and the at least one second color are a same color.

13. The method of claim 12, wherein the same color is non-white and the third color is white.

14. The method of claim 12, wherein operating the coloring mechanisms and the at least one light source in the branding state comprises setting the coloring mechanisms to a first level of any one of saturation, tint, and tone of the same color and setting the at least one light source to a second level of any one of saturation, tint, and tone of the same color different from the first saturation level.

15. The method of claim 10, wherein operating the coloring mechanisms and the at least one light source in the branding state comprises cycling the coloring mechanisms and the at least one light source through a plurality of colors.

16. The method of claim 10, wherein operating the coloring mechanisms and the at least one light source in the branding state comprises cycling the coloring mechanisms and the at least one light source through a plurality of at least one of shades, tints, and tones of colors when operating in the branding state.

17. The method of claim 10, further comprising providing an audio system coupled to the controller, and coordinating playing of audio on the audio system with operating the coloring mechanisms and the at least one light source in the branding state.

18. The method of claim 10, wherein operating the coloring mechanisms and the at least one light source in the branding state comprises coordinating operating in the branding state with a given event.

19. An aircraft color-lighting control system, the system comprising:
at least one sidewall comprising a plurality of electrically-controllable coloring mechanisms and a plurality of window structures of the vehicle, each coloring mechanism arranged for coloring each of the plurality of window structures with at least one first color;
a lighting sub-system comprising at least one light source mounted within the vehicle to illuminate an interior of the vehicle with at least one second color in a first state and with at least one third color in a second state; and
a controller coupled to the coloring mechanisms and the lighting sub-system and configured for concurrently operating:
the coloring mechanisms to color the at least one portion of the at least one sidewall with the at least one first color; and
the lighting sub-system to illuminate the interior of the vehicle with the at least one second color,
wherein the at least one sidewall is part of an aircraft, the interior is an aircraft cabin, each electrically-controllable coloring mechanism comprises a color-coated shield, wherein the at least one light source of the lighting sub-system is separate from any light source used within the controllable coloring mechanisms, and
wherein the branding state is defined by a coordinated display and control of color between the coloring mechanisms and the at least one light source.

\* \* \* \* \*